United States Patent [19] Goodson

[11] 3,719,903
[45] March 6, 1973

[54] DOUBLE SIDEBAND MODEM WITH EITHER SUPPRESSED OR TRANSMITTED CARRIER

[75] Inventor: William Eugene Goodson, Freehold, N.J.

[73] Assignee: Bell Telephone Laboratories, Incorporated, Murray Hill, N.J.

[22] Filed: June 25, 1971

[21] Appl. No.: 156,843

[52] U.S. Cl.....................332/44, 307/235 R, 329/50, 329/101, 329/192
[51] Int. Cl.............................H03c 1/52, H03d 1/24
[58] Field of Search.......329/50, 101, 192; 332/31 T, 332/37, 43 B, 44, 45; 325/137, 138, 329, 330; 307/235 R

[56] References Cited

UNITED STATES PATENTS

| | | | |
|---|---|---|---|
| 3,159,802 | 12/1964 | Dome | 332/37 R |
| 3,191,130 | 6/1965 | Rudd et al. | 307/235 X |
| 3,213,369 | 10/1965 | McAuliffe | 332/45 |
| 3,389,327 | 6/1968 | Fine et al. | 332/45 X |
| 3,430,151 | 2/1969 | Badessa | 329/50 |
| 3,482,173 | 12/1969 | Hilbert | 329/50 |

*Primary Examiner*—Alfred L. Brody
*Attorney*—R. J. Guenther et al.

[57] ABSTRACT

An inexpensive, two-transistor modem wherein the first transistor is a high gain amplifier connected to receive the modulating signal, and the second transistor is connected as a shunt modulator driven by a carrier signal source. Individual resistors are connected with the collector and emitter electrodes of the first transistor and so proportioned that the input baseband (for modulation) and carrier (for demodulation) signals are cancelled at a common summing node. The circuit is useful for double sideband suppressed or transmitted carrier applications, especially where the desired sidebands are very near, or go down to, the baseband frequencies.

8 Claims, 2 Drawing Figures

INVENTOR
W. E. GOODSON
BY
ATTORNEY

DOUBLE SIDEBAND MODEM WITH EITHER SUPPRESSED OR TRANSMITTED CARRIER

BACKGROUND OF THE INVENTION

This invention relates to modulator-demodulator circuits and, more particularly, to double sideband modulator-demodulator circuits with suppressed or transmitted carrier.

The prior art abounds in modulator-demodulator circuits (hereinafter referred to as modem circuits) which either modulate or demodulate an amplitude modulated, double sideband signal with either suppressed or transmitted carrier. Suppression of the baseband (during modulation) and carrier (during demodulation) in these circuits is achieved by the use of balanced and matched active devices, such as tubes, transistors, or diodes, and/or balanced and matched inactive devices, such as transformer windings, or portions of transformer windings. Although the suppression obtained thereby is satisfactory for most applications, the use of balanced and/or matched components is quite expensive, notably for applications where the desired sidebands are very near, or go down to, the baseband frequencies. The obvious alternative to the use of these expensive modems employing balanced circuitry is the use of a filter to suppress the baseband (for modulation) or carrier (for demodulation) signals that feed through the shunt or series modulator. Filters with the required degree of suppression cannot go down to the baseband frequencies and are also expensive, hence, no real advantages from economic or application standpoints are obtained thereby.

It is, therefore, an object of this invention to provide a simple and inexpensive modem which does not require the use of expensive baseband suppression filters or balanced active and/or inactive devices.

It is a further object of this invention to provide such an inexpensive modem capable of suppressing baseband and carrier signals where the desired sidebands are very near, or go down to, the baseband frequencies.

SUMMARY OF THE INVENTION

The present invention is directed to an unbalanced modem circuit wherein the input is connected to a transistor amplifier. The amplifier has both non-inverted (in-phase) and inverted (180° out-of-phase) outputs with respect to the phase of the input signal. A non-linear device, such as a switching shunt modulator, is connected with a source of carrier frequency and the inverted output of the amplifier to either modulate or demodulate the input signal in accordance with principles well known to the art. The inverted and non-inverted outputs of the amplifier are interconnected by individual proportioned resistors to a common summing node which is also connected to an output terminal. Since the transmitted baseband or received carrier sideband signals present at the inverted output of the amplifier are 180° out-of-phase with respect to the signals present at the non-inverted output of the amplifier, these signals are cancelled at the summing node. The input signal to the modem is thus substantially cancelled with respect to the signals appearing at the output terminal. Suppression or cancellation of the input signals to the modem is thereby inexpensively obtained with the use of two transistors and resistors without the need for balanced or matched components of any kind.

For applications where a very high degree of input signal suppression is required, the gain of the amplifier may be increased in a simple manner, such as by the use of an additional transistor, without appreciably increasing the cost of the modem or requiring balanced or matched components. The amplitude modulated double sideband input or output signal may have either suppressed or transmitted carrier. When used as a modulator the presence or absence of the carrier frequency in the output signal depends on the presence or absence of d.c. bias in the modulator, with the magnitude of the transmitted carrier being controlled in accordance with the magnitude of the d.c. bias in the modulator.

BRIEF DESCRIPTION OF THE DRAWING

Other objects and features of the present invention will be apparent from the following discussion and drawing in which.

DETAILED DESCRIPTION OF THE INVENTION

Figure 1:
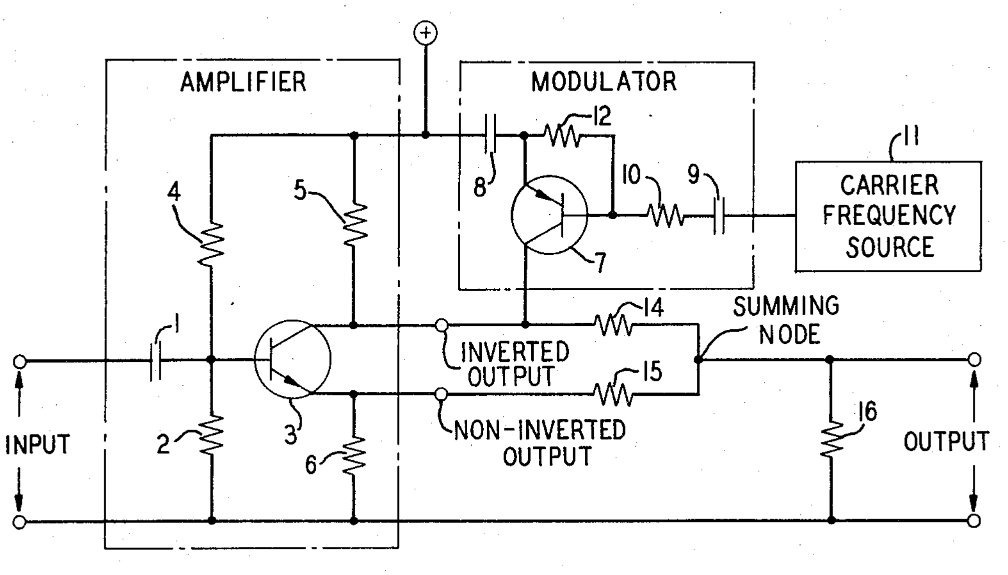
FIG. 1 is a schematic illustration of an amplitude modulated, double sideband, suppressed carrier modem embodiment of the present invention.

As shown in FIG. 1 of the drawing, an a.c. coupling capacitor 1 and resistor 2 are serially connected with the input terminals to the modem. The base electrode of amplifier transistor 3 is connected to both capacitor 1 and resistor 2. Resistor 4 connects the base electrode of transistor 3 to a source of positive biasing potential. Resistor 5 connects the collector electrode of transistor 3 to the source of positive biasing potential and resistor 6 connects the emitter electrode of amplifier transistor 3 to the common input-output terminal. Resistors 2, 4, 5, and 6 are chosen with relation to the remaining components of the modem to provide the d.c. bias operating potentials for amplifier transistor 3.

The shunt switching modulator of FIG. 1 comprises a transistor 7 whose collector-emitter or switching path is connected across resistor 5 by capacitor 8. Coupling capacitor 9 is serially connected with current limiting resistor 10 between the base electrode of modulator transistor 7 and the output of the carrier frequency source 11. Resistor 12 is connected across the base and emitter electrodes of modulator transistor 7 to increase the speed at which transistor 7 can be switched. Resistor 14 connects the inverted output of the amplifier from the collector electrode of transistor 3 to the summing node which is connected to an output terminal. Resistor 15 connects the non-inverted output of the amplifier from the emitter electrode of transistor 3 to the summing node.

The operation of the modem of FIG. 1 will now be discussed in detail. Since the circuit of FIG. 1 will inherently either modulate or demodulate, depending on the nature of the signal present at its input terminals, only the modulation process will be discussed with the understanding that the same process occurs for demodulation in the manner well known in the art. In other words, the circuit will operate in the same manner whether baseband signals to be modulated or carrier sideband signals (with or without the carrier signal) to be demodulated are present at its input terminals.

The baseband signal to be modulated at the input terminals of the circuit of FIG. 1 is a.c. coupled through capacitor 1 to the base electrode of transistor 3 of the amplifier. Characteristically, the baseband signal appearing at the emitter electrode of transistor 3 is substantially the same in magnitude and phase as the input baseband signal appearing at the base electrode of transistor 3. The signal at the collector electrode of transistor 3 is an amplified version of the input baseband signal appearing at the base electrode of transistor 3 and is characteristically inverted by 180° with respect to the baseband signal at the base electrode of transistor 3. The output taken from the collector electrode of transistor 3 in FIG. 1 is thus labeled as the inverted output of the amplifier, while the output taken from the emitter electrode of transistor 3 is labeled as the non-inverted output. Resistor 14 connects the inverted output baseband signal to the summing node, and resistor 15 connects the non-inverted baseband output to the summing node. The magnitudes of resistors 14 and 15 would be chosen from one of a large number of possible combinations such that the magnitude of the non-inverted baseband output signal appearing at the summing node is substantially equal to the magnitude of the inverted baseband output signal appearing at the summing node. Since the baseband inverted and non-inverted output signals are, as noted heretofore, 180° out-of-phase, the baseband output signals cancel and only the carrier sidebands and certain harmonics appear across the output terminals as discussed hereinafter. Suppression or cancellation of the input signal at the output terminals is thus obtained simply and inexpensively without the need for balanced or matched parameters. The gain of transistor 3 is sufficiently high so that variations in gain of this transistor do not substantially affect the degree of suppression obtained at the summing node. Because of the baseband suppression thus obtained, the circuit of FIG. 1 is especially useful for applications where the desired sidebands are very near, or go down to, the baseband frequencies and simple and inexpensive circuitry is desired.

Modulation is obtained in the circuit of FIG. 1 by switching the transistor 7 at the carrier frequency rate. The manner in which modulation is achieved is best seen by initially assuming that no baseband input signal is present at the input terminals. For this condition we have only d.c. potentials present in the circuit, with transistor 7 being switched at the carrier frequency rate by the carrier frequency source 11. After a few switching cycles of transistor 7, the average value of the voltage at the collector electrode of transistor 3 will be equal to the average value of the voltage at the emitter electrode of transistor 7 due to the potential stored in capacitor 8. Since the potential at the collector electrode of transistor 3 and the emitter electrode of transistor 7 are at the same level, the switching cycles of transistor 7 will no longer produce an output signal at the carrier frequency, and the carrier is thus suppressed at the output terminals.

The presence of baseband input signals at the input terminals of the modem causes variations in the instantaneous potentials at the collector electrode of transistor 3 which are modulated in accordance with the switching frequency of transistor 7 to provide the desired double sideband output signal. Since the average value of the potential at the emitter electrode of transistor 7 and the collector electrode of transistor 3 remains substantially unchanged, the carrier frequency remains suppressed. The output signal at the common connection of the collector electrodes of transistors 3 and 7 is thus the desired double sideband without carrier, the sidebands around the higher order carrier harmonics, and the baseband input signal itself. Except for the baseband signal, which is cancelled at the summing node, these signals are coupled through resistor 14 to the load resistor 16. As discussed heretofore, with the proper selection of proportioned resistors 5, 6, 14, and 15 from a large number of possible combinations, the baseband input signal will be cancelled at the summing node and the net output current signal into resistor 16 will be just the desired double sideband signal plus the sidebands around the higher order carrier harmonics. Resistor 16 may be any positive value and may vary from zero to infinity. In practice, a resistor 16 of zero value would mean the summing node of an operational amplifier or a grounded base transistor, while a resistor 16 of a finite value could be a resistor or a relatively inexpensive filter which suppresses the higher order harmonics. A detailed illustrated and mathematical treatment of shunt switching modulation as practiced by transistor 7 of the present invention may be found at pages 99 through 104 of the text *Transmission Systems and Communications*, third edition, by Members of the Technical Staff, Bell Telephone Laboratories, copyright 1964.

The degree of baseband and carrier suppression obtained with the circuit of FIG. 1 is normally sufficient for most applications and comparable with the suppression obtained with the more complex and expensive modems of the prior art employing balanced circuitry. If desired, however, higher degrees of suppression may be simply and inexpensively obtained in accordance with the teachings of the present invention, as discussed in detail in connection with the circuit of FIG. 2. The circuit of FIG. 1 may also be modified to provide a double sideband transmitted carrier output, as also discussed in connection with FIG. 2. Although a shunt switching element is employed in the circuit of FIG. 1, it will be obvious that another non-linear device or devices (e.g., a field effect transistor switched between two resistance levels) could be employed in a classical manner to obtain the desired modulation or demodulation without departing from the spirit and scope of the present invention.

Figure 2:
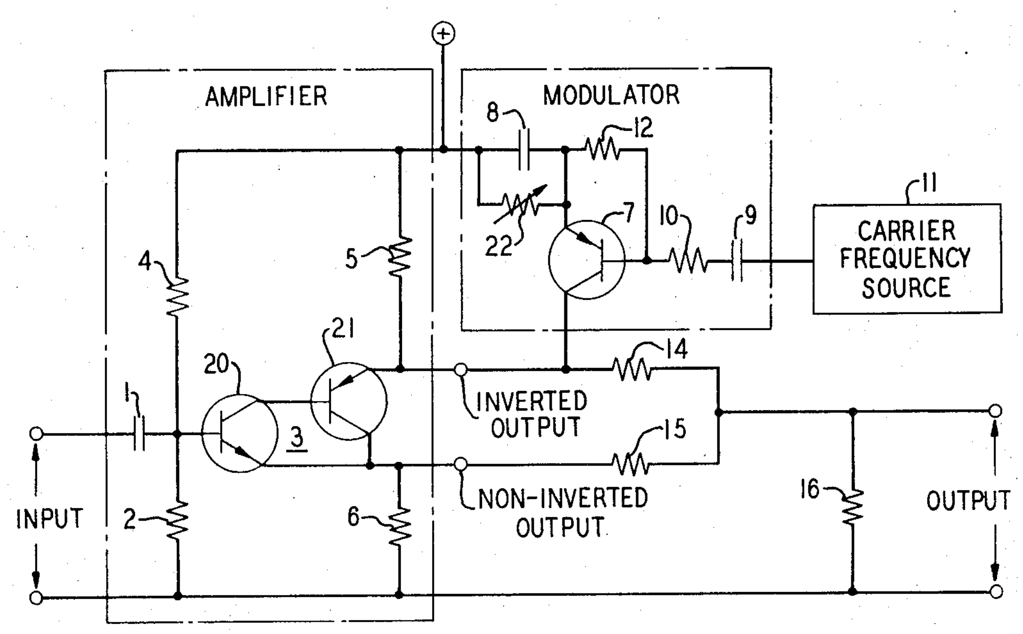
FIG. 2 is a schematic illustration of an amplitude modulated, double sideband, transmitted carrier modem embodiment of the present invention with a very high degree of input signal suppression.

The circuit of FIG. 2 of the drawing has a very high degree of baseband suppression with a double sideband transmitted carrier output signal. Baseband input signal suppression is obtained in the same manner as discussed heretofore in connection with the circuit of FIG. 1. The circuit of FIG. 2 differs from the circuit of FIG. 1 in that the transistor 3 of the amplifier is replaced by a pair of transistors 20 and 21, and in the connection of a variable resistor 22 across the capacitor 8 of the modulator network. The remaining components of this FIG. 2 circuit perform the same functions as their counterparts in the circuit of FIG. 1 and bear the same numerical designations.

Transistor 3 of the amplifier of the circuit of FIG. 1 is, as noted heretofore, replaced in FIG. 2 by a pair of transistors 20 and 21. The base electrode of transistor 20 is connected to the juncture of capacitor 1 with resistors 4 and 6, and its collector electrode is connected to the base electrode of transistor 21. The emitter electrode of transistor 20 and the collector electrode of transistor 21 are connected to the common input-output terminal by resistor 6. Biasing resistor 5 connects the emitter electrode of transistor 21 to the source of positive biasing potential. Transistors 20 and 21 are thus connected to increase the gain of the amplifier of FIG. 2 over that which can be obtained with the single transistor amplifier of the circuit of FIG. 1. It can be shown that the higher gain obtained by the use of transistors 20 and 21 in turn increases the degree of both the baseband and carrier suppression to very high levels. (Carrier suppression is obtained by removing resistor 22 as discussed hereinafter.) It should be noted that this higher degree of suppression is also obtained simply and inexpensively merely by the addition of a single transistor without requiring balanced or matched components.

The manner in which the modem circuits of FIGS. 1 and 2 of the present invention provide a transmitted carrier output is illustrated in FIG. 2 with the connection of the variable resistor 22 across the capacitor 8. The resistance of the variable resistor 22 will determine the degree of carrier suppression obtained in the circuit of FIG. 2. As discussed heretofore in connection with FIG. 1, the average value of the voltage at the emitter electrode of transistor 7 will be equal to the average value of the voltage at the inverted output of the amplifier after a few switching cycles of transistor 7. If the resistor 22 were not provided in the circuit of FIG. 2, the average value of the voltage at the emitter electrode of transistor 21 would similarly be equal to the average value of the voltage of the emitter electrode of transistor 7 after a few switching cycles of transistor 7. As also discussed heretofore, for these conditions the carrier frequency will be suppressed. If, however, additional d.c. bias is introduced in the modulator circuit, either by a battery or variable resistor 22, then the average value of the potential at the emitter electrode of transistor 7 will no longer assume the average value of the potential at the inverted output of the amplifier. In the absence of this balanced condition, a signal at the carrier frequency will be coupled via resistor 14 to the output terminals and a carrier signal will be transmitted. The magnitude of the d.c. bias introduced, as controlled by the setting of the variable resistor 22, thus determines the degree of suppression or transmission of the carrier frequency. Once again, it should be noted that control of the degree of transmission of the carrier frequency is achieved simply and inexpensively with a single variable resistor and without the need for balanced or matched components.

As noted heretofore, the demodulation function of the circuits of FIGS. 1 and 2 would be exactly the same as the modulation process. If the circuit of FIG. 2 were used exclusively as a demodulator, however, the presence of the carrier frequency at the output terminals is not desired and resistor 22 would be eliminated. When the circuits of the present invention are used as suppressed carrier demodulators, they suppress the received carrier sideband signals and the injected carrier signal. When used as transmitted carrier demodulators, they also suppress the transmitted carrier. Conversely, as a suppressed carrier modulator, the carrier and baseband signals are suppressed while as a transmitted carrier modulator only the baseband signals are suppressed.

In the present invention, therefore, modulation and demodulation is achieved simply and inexpensively with the use of only two or three transistors, depending upon the degree of suppression desired, and appropriate resistors without the prior art need for balanced or matched devices. In general, although the modem has general application, the input signal cancellation obtained make circuits embodying the present invention especially useful where the desired sidebands are very near, or go down to, the baseband frequencies and inexpensive and simple circuitry is desired.

The above-described arrangement is illustrative of the application of the principles of the invention. Other embodiments may be devices by those skilled in the art without departing from the spirit and scope thereof.

What is claimed is:

1. An unbalanced modem circuit having a pair of input and a pair of output terminals comprising an amplifier having an input connected to one of said pair of modem input terminals, the other of said modem input terminals being connected to one of said pair of output terminals to form a common input-output terminal, said amplifier having an inverted output and a non-inverted output, non-linear means connected to and controlled by a source of carrier frequency to regulate conduction through said non-linear means in accordance with the frequency of the carrier signal, means connecting said non-linear means between the inverted output of said amplifier and said common input-output terminal, and means interconnecting said inverted and non-inverted outputs of said amplifier in a common summing node which is connected to the other of said pair of output terminals, whereby the input signal to said modem is substantially suppressed at said output terminals without the need for balanced and matched circuit parameters.

2. An unbalanced modem circuit in accordance with claim 1 wherein said means interconnecting said inverted and non-inverted outputs of said amplifier in a common summing node comprise individual resistors connected with each of said outputs, said resistors being proportioned so as to cause said baseband and carrier sideband signals appearing at said amplifier inverted and non-inverted outputs to be substantially cancelled during modulation and demodulation, respectively.

3. An unbalanced modem circuit having a pair of input and a pair of output terminals comprising an amplifier having an input connected to one of said pair of modem input terminals, the other of said pair of modem input terminals being connected to one of said pair of modem output terminals to form a common input-output terminal, said amplifier having an inverted output and a non-inverted output, switching means connected to a source of carrier frequency to interrupt conduction through said switching means in accordance with the carrier frequency signal, means connecting said switching means from said amplifier inverted output to said common input-output terminals, first and second resistors connected from the inverted and non-inverted outputs of said amplifier, respectively, and means interconnecting said first and second resistors and the other of said pair of output terminals in a common summing node, said first and second resistors being proportioned so as to cause the input signal to said modem to be substantially cancelled at said output terminals.

4. An unbalanced modem in accordance with claim 3 wherein said amplifier comprises a first transistor having its base connected to the input of said amplifier, its collector connected to the said inverted output of said amplifier and its emitter connected to the non-inverted output of said amplifier, a third resistor is connected from the collector electrode of said first transistor to a source of biasing potential, and said switching means comprises a second transistor having base, collector, and emitter electrodes, means connecting the base electrode of said second transistor to said source of carrier frequency, and means connecting the collector-emitter path of said second transistor across said third resistor, said first and second resistors being proportioned with respect to said third resistor to provide said substantial cancellation of the modem input signal at said summing node.

5. An unbalanced modem in accordance with claim 3 wherein said means connecting said switching means from said amplifier inverted output to said common input-output terminals includes a serially connected capacitor which charges to an average potential equal to the average potential appearing at said inverted output of said amplifier, whereby the carrier frequency signal appearing at said output terminals is suppressed.

6. An unbalanced modem in accordance with claim 5 wherein said means connecting said switching means from said amplifier inverted output to said common input-output terminals additionally includes a source of d.c. bias, the magnitude of the d.c. bias being proportional to the magnitude of the transmitted carrier signal introduced at said output terminal.

7. An unbalanced modem having a pair of input and a pair of output terminals comprising an amplifier which includes first and second transistors, the base electrode of said first transistor being connected to one of said pair of modem input terminals, the collector electrode of said first transistor being connected to the base electrode of said second transistor, and the emitter electrode of said first transistor being connected to the collector electrode of said second transistor, said amplifier having an inverted output at the emitter electrode of said second transistor and a non-inverted output at the collector electrode of said second transistor, the other of said pair of modem input terminals being connected to one of said pair of modem output terminals to form a common input-output terminal, a first resistor connected between the non-inverted output terminal of said amplifier and said common input-output terminal, a second resistor connected from the inverted output terminal of said amplifier to a source of positive biasing potential to provide the biasing potentials for said first and second transistors, non-linear means comprising a third transistor having its base electrode connected to a source of carrier frequency signal and a capacitor serially connected with the collector-emitter path of said third transistor from said source of biasing potential to the inverted output of said amplifier, a third resistor connected to the inverted output of said amplifier, a fourth resistor connected to the non-inverted output of said amplifier, and means interconnecting said third resistor, said fourth resistor, and the other of said pair of output terminals in a common summing node, said first, second, third, and fourth resistors being proportioned such that the input signal appearing at said input terminals is substantially cancelled at said output terminals.

8. An unbalanced modem in accordance with claim 7 wherein a variable resistance is connected across said capacitor to introduce a d.c. bias for said third transistor, the magnitude of said d.c. bias being proportional to the magnitude of the carrier signal transmitted from said output terminals.

* * * * *

Disclaimer 3,719,903.—*William Eugene Goodson*, Freehold, N.J. DOUBLE SIDEBAND MODEM WITH EITHER SUPPRESSED OR TRANSMITTED CARRIER. Patent dated Mar. 6, 1973. Disclaimer filed May 7, 1973, by the assignee, *Bell Telephone Laboratories, Incorporated.*

Hereby enters this disclaimer to all claims of said patent.

[*Official Gazette December 4, 1973.*]